United States Patent [19]

Zabadneh

[11] 4,078,385
[45] Mar. 14, 1978

[54] BRAKE POWER BOOSTING MECHANISM

[75] Inventor: M. Khaled Zabadneh, Neuhausen, Germany

[73] Assignee: Daimler-Benz Aktiengesellschaft, Germany

[21] Appl. No.: 639,989

[22] Filed: Dec. 11, 1975

[30] Foreign Application Priority Data

Dec. 14, 1974 Germany .............................. 2459187

[51] Int. Cl.² ............................................ B60T 13/12
[52] U.S. Cl. ........................................ 60/548; 60/550;
60/551; 60/562; 60/574; 60/593; 60/594;
91/460
[58] Field of Search ................. 60/547, 551, 552, 548,
60/550, 555, 562, 574, 593, 594; 74/512, 516,
518; 91/460

[56] References Cited

U.S. PATENT DOCUMENTS

| 2,934,041 | 4/1960 | Ayers | 60/548 |
| 2,976,849 | 3/1961 | Stelzer | 60/550 |
| 2,980,066 | 4/1961 | Stelzer | 60/551 |
| 3,034,301 | 5/1962 | Vick | 60/551 |
| 3,064,431 | 11/1962 | Schnell | 60/548 |
| 3,327,479 | 6/1967 | Harness | 60/550 |
| 3,713,292 | 1/1973 | Huffman | 60/550 |
| 3,739,579 | 6/1973 | Lutz | 60/594 |
| 3,898,809 | 8/1975 | Baker | 60/548 |
| 3,935,709 | 2/1976 | Mathues | 60/547 |

Primary Examiner—Martin P. Schwadron
Assistant Examiner—Abraham Hershkovitz
Attorney, Agent, or Firm—Craig & Antonelli

[57] ABSTRACT

A brake force booster installation with a mechanical, pneumatic or hydraulic actuating mechanism acting on a servo- and adjusting-unit, which in turn acts on the master cylinder, with filling devices and with control- and shifting-devices; the filling devices and the actuating mechanism are thereby actuated by movement of the brake pedal lever pivotally connected at two connecting points to the piston rods of an actuating piston and of a filling piston while the filling devices and the actuating devices are so arranged separated from one another and are so connected with the control and shifting devices that the brake pedal lever during its idle path is actuated with one lever ratio by holding fast one piston rod and thereupon the working effect is realized by automatically shifting to a different translation ratio.

18 Claims, 3 Drawing Figures

BRAKE POWER BOOSTING MECHANISM

The present invention relates to a brake-force booster or servo-mechanism with a mechanical, pneumatic or hydraulic actuating mechanism acting on a servo- as well as adjusting-unit, which actuating mechanism again acts on the master cylinder, with filling devices and with control- as well as shifting-devices, whereby the filling devices and the actuating mechanism are actuated by movement of the brake pedal lever pivotally connected at two pivot points.

A brake-force booster or servo-mechanism of the aforementioned type therefore essentially consists of four units, namely of the servo- as well as adjusting-unit, of the filling devices, of the control- as well as shifting-devices and of the working unit, namely, of the devices belonging to the master cylinder which at present is for the most part a tandem master cylinder. The brake pedal acts on the servo- as well as adjusting-unit either directly in the case of a mechanical construction of the subject matter of the present invention or by way of a brake-force booster or servo-mechanism operating with vacuum (vacuum booster) in the case of a pneumatic construction of the subject matter of the present invention or with the aid of a hydraulic fluid subjected to the pump pressure in the case of a hydraulic construction of the subject matter of the present invention which in conjunction with the movements of the brake lever acts on the servo- and adjusting-unit.

In the prior art brake-force servo- or booster installations, especially in those with hydraulic power boost or amplification, which operate with a constant translation or transmission ratio of the brake pedal actuation, the brake pedal path or travel is adequately utilized, however, the actuating force is not utilized sufficiently well. It is exactly the reverse in installations which include a shifting of the brake pedal lever translation or transmission ratio; more particularly, with these latter types of installations, the foot force is utilized better, however, the pedal path or travel is wasted.

By the use of filling pistons in hydraulic installations, smaller actuating forces are increased and larger actuating forces are reduced. Nonetheless, the brake systems with filling pistons remain without practical realization because the prior art constructions became effective in a disadvantageous manner on the brake function.

Sudden jumps occurred in these prior art systems both in the braking as also in the actuating force. By the separation of the filling and working rhythms or cycles from one another, it is possible to realize both the filling effect as also the working effect in a useful manner.

The aim of the present invention resides in avoiding these disadvantages and to propose a brake force servo- or booster installation which avoids the aforementioned disadvantages but which combines in itself the advantages of each of the prior art systems. As to the rest, such an installation should be capable of being assembled in a relatively simple manner and with relatively few parts and should be capable of being constructed also in a space-saving manner by the combination of the essential parts within a single housing.

The underlying problems are solved according to the present invention in that the brake pedal level is pivotally connected at piston rods of the actuating piston and of the filling piston, in that the filling devices and the actuating devices are so arranged separated from one another and together with the control and shifting devices are so constructed that the brake pedal lever during its idling motion is actuated with one lever effect by holding fast one of the two piston rods and thereafter the working effect is carried out by an automatic shifting to another translation or transmission ratio. For that purpose, the point of pivotal connection of the brake pedal lever opposite the brake pedal, properly speaking, may be pivotally connected at the piston rod of the filling piston and the point of pivotal connection of the brake pedal lever nearer the brake pedal, properly speaking, may be pivotally connected at the piston rod of the actuating piston.

The subject matter of the present invention therefore includes as essential components a servo- as well as adjusting-unit, onto which the brake pedal acts directly, and a working unit, namely, the master cylinder, which is actuated by the servo- as well as adjusting-unit with the aid of a fluid utilizable in the hydraulic system. It is therefore appropriate to arrange the servo- as well as adjusting-unit spatially in front or ahead of the working unit, i.e., coaxially to the master cylinder. The filling device is provided as a further unit in the subject matter of the present invention which must be arranged at a certain distance from the servo- and adjusting-unit in order that the points of pivotal connection given by the location of the piston rod of the filling piston and of the actuating piston have the desired spacing from one another with a view toward the desired translation or transmission ratio of the brake pedal lever. The further unit which includes the control and shifting devices could be accommodated, as such, at any desired location because this unit has to be connected only by way of hydraulic lines with the servo- and adjusting-unit, on the one hand, and with the filling devices as well as with a return tank, on the other. In order to properly utilize the necessary distance between the filling devices and the servo- as well as adjusting-unit, it has proved as appropriate to arrange the control and shifting devices between the filling devices and the servo- as well as adjusting-unit.

According to a further feature of the present invention, the servo- as well as adjusting-unit, the filling device, and the control and shifting devices arranged therebetween, may therefore be accommodated in a common housing and together with the master cylinder may form a structural unit.

For purposes of transmitting the force of the actuating piston to the piston of the master cylinder as well as for purposes of enabling the shifting of the pivot action of the brake pedal lever from its one point of pivotal connection to the other point of pivotal connection, and for the installation of the control and regulating devices necessary therefor, a connecting space filled with an incompressible fluid and connecting with each other the working unit and the master cylinder may be arranged between the piston of the master cylinder and an actuating servo-piston smaller in cross section as compared therewith and belonging to the actuating mechanism; the connecting space may be connected thereby by way of housing bores and spaces provided in the control- as well as shifting-devices with a filling cylinder space whose space volume can be changed by the restrained filling piston which is larger in cross section than the other piston. The different cross sections between the piston of the master cylinder and the actuating servo-piston also serve for the translation of the transmitted force since the smaller path of the master cylinder piston which is larger in cross section is confronted by the larger path of the actuating servo-piston which is smaller in cross section. This translation, of course, is lost when both pistons contact one another which must be prevented by the incompressible fluid enclosed in the aforementioned connecting space.

For purposes of controlling the brake force servo- or booster mechanism in the idle path and beyond the filling period, for purposes of automatically shifting the pivoting action of the brake pedal lever about successively different points of pivotal connection, the brake force servo-unit should be so constructed that the spaces in the control as well as the shifting device are connected by way of bores disposed in a control slide member guided therein with a pressure space at one end face of the control slide valve member, whose internal pressure is able to displace the control slide valve member against the pressure of springs in such a manner that initially a line connected with a return tank and during a further pressure increase, also the bores connected with the connecting space are closed off and then the line is again opened whereby the shifting of the point of pivotal connection of the brake pedal lever is brought about. It may thereby happen that the hydraulic fluid, during the pivoting of the brake pedal lever, is displaced into the connecting space by the filling piston out of the associated filling cylinder by way of bores, which are in communication with the control slide valve member. The same hydraulic fluid causes the control slide valve member to interrupt a line which connects a pressure-fluid receiving-space disposed in the actuating housing with the return tank. As a result thereof, the piston disposed in the actuating housing is held fast and the point of pivotal connection of the brake pedal lever disposed at its piston rod is fixed thereby. With a further pressure increase, also the bores connected with the connecting space are closed off. This means the end of the idling or lost motion so that the brake shoes and brake pads now abut at the brake disk. With the closure of the bores connecting the connecting space with the filling cylinder, additionally the point of pivotal connection of the brake pedal lever is shifted. The point of pivotal connection of the brake pedal lever is now the pivot point which is disposed at the piston rod of the now rigid filling piston. The other point of pivotal connection is now again movable, after also the line leading from the pressure-fluid receiving-space to the return tank is again opened.

With the use of a hydraulic actuating mechanism by a pump, pressure fluid is conducted out of the pump to the end face of the actuating servo-piston facing the brake pedal with the further displacement of the actuating servo-piston after the shifting of the point of pivotal connection of the brake pedal lever, and the actuating servo-piston is displaced in the direction toward the master cylinder. This pressure from the pump then displaces the actuating servo-piston with ever-increasing force toward the cylinder as long as the brake pedal continues to be depressed and carries out the braking.

The master cylinder must have the possibility to vent automatically. This takes place in that the brake pedal is depressed and is again released suddenly so that the master cylinder piston is being returned jerk-like and rapidly under the action of return springs and as a result thereof, any air bubbles can be replaced with the brake fluid by way of the expansion ports. In order that the force of return springs is far-reachingly compensated for in the idling path or free play, a compensating spring is arranged in the filling cylinder. This compensating spring is restrained, and more particularly only so far that the idling path or free play of the master cylinder piston or of the master cylinder pistons is compensated for. As to the rest, the restraining action of the compensation spring enables a sufficiently rapid return of the master cylinder piston up to the idling-path or free-play end-point and as a result thereof, permits a venting of the master cylinder.

If the filling cylinder is actuated, then it should not be prevented during the advance and the pressure increase conditioned thereby in the filling cylinder, that a vacuum results on the other side. For that reason, the space in which is disposed the compensating spring, is connected according to a further feature of the present invention with a fluid reservoir or tank.

Also the control slide valve member is correspondingly constructed within the scope of the present invention so that it is displaceable against the force of springs, of which initially the force of a smaller blocking spring has to be overcome until the return to the line which connects the fluid-receiving space with the return tank, is closed off. This path of the control slide valve member corresponds to the idling or free-play of the brake force booster or servo-mechanism. The control slide valve member then continues to move in the same direction during a further actuation of the brake pedal until upon reaching the filling pressure, the force of a larger restrained control spring also disposed in the control cylinder is overcome whose restraining permits the response of the smaller blocking spring prior to this control spring. The space which receives both of these springs, also has to be vented in order not to impair the movement of the piston and of the sleeve displaced by the springs. This venting takes place by way of bores which permit entry of the air into the spring-accommodating space. Consequently, the filling operation is terminated with the abutment of an end face of the control piston at a sleeve pressed by the control spring against the blocking spring. The pressure depends on the strength of the control spring, which is necessary to actuate the pistons of the master cylinder. This means that also the force which is necessary for braking and which has to be applied at the brake pedal for purposes of braking, depends on the force and the magnitude of this control spring.

A fluid-receiving space was mentioned already heretofore which partly surrounds the actuating servo-piston that is able during its movement to displace the fluid disposed therein. The fluid-receiving space is connected, on the one hand, with a return tank and on the other hand, with a pump. The pressure fluid-receiving space is in communication according to the present invention by way of a unilaterally acting ball valve with the working pressure space which can be filled with pressure fluid under the effect of a pump. The ball valve is thereby pressed against its seat by a restrained relief spring supported against the actuating piston, whose restraining action assures an approximately constant abutment pressure of the ball valve against its seat also at a pressure of the working piston against the actuating servo-piston or with a pressure increase in the working space. It is avoided thereby that the ball during the actuation of the actuating piston and the force applied thereby is being forced too strongly against its seat and as a result thereof the ball or the seat is damaged. Additionally, it is made possible by the restrained spring that when the actuating piston is taken back, the ball is lifted off from its seat, the working pressure space is brought into communication with the pressure fluid-receiving space and, as a result thereof, with a return to the hydraulic tank and thus a rapid falling back or return also of the actuating-servo-piston is made possible thereby.

As a result of jamming or wedging of the control slide valve member, the pressure in the fluid-receiving space may receive very high values which prevents a further actuation of the brake force servo-mechanism in that the working piston is held in the locked condition. In order to avoid this, a safety valve is provided in the line connecting the fluid-receiving space with the return tank, which connects the line with the return tank when exceeding a predetermined pressure limit.

It was also already mentioned hereinabove that the brake force servo-mechanism can also be pneumatically actuated without a hydraulic pump. The actuating piston is then not actuated by the brake lever itself but instead by a pneumatically operating brake force booster or servo-mechanism (vacuum booster) which acts directly on the actuating servo-piston as in the construction of the actuating piston operating with the fluid pressure pump.

Also with a purely mechanical actuation of the brake force booster or servo-installation, the additional fluid pump can be dispensed with. The actuating servo-piston is then actuated exclusively by the actuating piston which is actuated directly by the brake pedal lever as also in the construction with the pump.

Accordingly, it is an object of the present invention to provide a brake force servo-installation which avoids by simple means the aforementioned shortcomings and drawbacks encountered in the prior art.

Another object of the present invention resides in a brake power booster system in which the brake pedal path is adequately utilized and the actuating force is also sufficiently used.

A further object of the present invention resides in a brake force servo-system in which sudden jumps do not occur in the braking as also in the actuating force.

A still further object of the present invention resides in a brake force servo-installation which consists of relatively few parts and is of relatively space-saving construction.

Still another object of the present invention resides in a brake force servo system of the type described above in which all essential parts are combined into a single housing, thereby enabling a space-saving, simple installation also into already existing systems.

These and other objects, features and advantages of the present invention will become more apparent from the following description when taken in connection with the accompanying drawing which shows, for purposes of illustration only, two embodiments in accordance with the present invention, and wherein.

Figure 1:
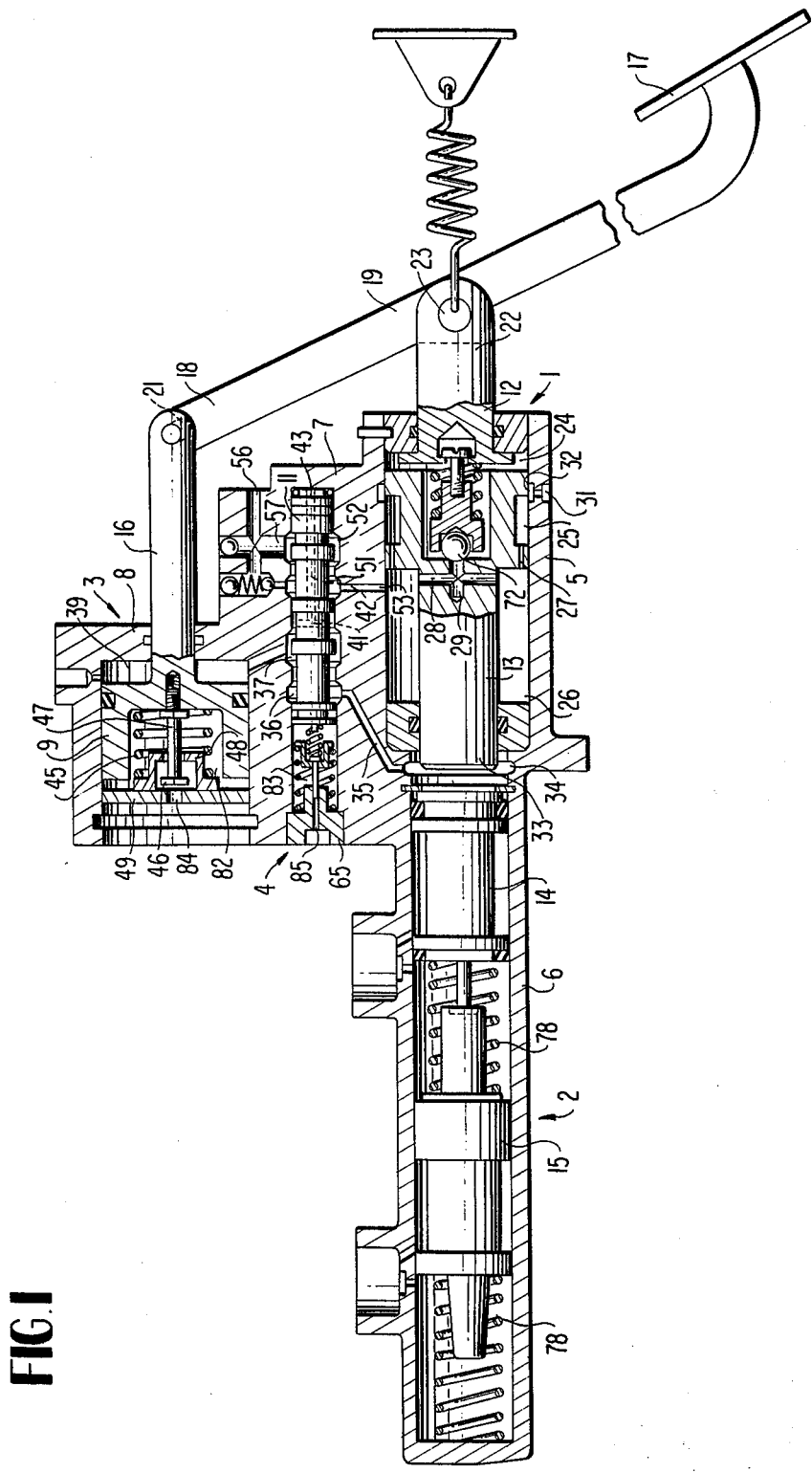
FIG. 1 is a partial cross-sectional view through a brake force servo-installation in accordance with the present invention which can be operated by means of a hydraulic actuation.

Referring now to the drawing wherein like reference numerals are used throughout the various views to designate like parts, the brake force servo- or booster installation illustrated in FIG. 1 is composed of several parts. The part generally designated by reference numeral 1 is the servo- as well as adjusting-unit, the part generally designated by reference numeral 2 is the working unit with the master cylinder, the part generally designated by reference numeral 3 is the filling unit, and the part generally designated by reference numeral 4 includes the control as well as shifting devices. The servo- as well as adjusting-unit 1 is located in the actuating housing 5 which is adjoined by the master cylinder with its master cylinder housing 6. The control cylinder 7 is disposed above the master cylinder and the actuating housing 5 while the filling cylinder 8 is arranged on the control cylinder 7. The actuating housing 5, the master cylinder 6, the control cylinder 7 and the filling cylinder 8 are formed in the illustrated embodiment by a common housing.

The filling piston 9 can be reciprocated within the filling cylinder 8. The control piston 11 is able to slide within the control cylinder 7 while the actuating piston 12 is able to reciprocate in the actuating housing 5 on the pedal side and the actuating servo-piston 13 is able to reciprocate in the actuating housing 5 on the master cylinder side. Master cylinder pistons 14 and 15 are provided in the usual manner within the master cylinder 6.

The end 18 of the brake pedal lever 19, opposite the brake pedal 17, properly speaking, is pivotally connected at the free end of the filling piston rod 16 by the use of an elongated aperture 21. The brake pedal lever 19 is also pivotally connected at the piston rod 22 of the actuating piston 12 by means of the joint 23. The distance of the brake pedal 17 to the elongated aperture 21 is four times as large as the distance thereof from the joint 23 so that therefore with the actuation of the brake pedal lever 19, forces can be applied at the ratio of 1 : 4.

The cross section of the actuating piston 12 protruding into the working space 24 is smaller than the cross section of the actuating servo-piston 13 adjoining the working space 24 at its other side. An annular groove 25, a step 26 and bores 27, 28 and 29 are provided at and in the actuating servo-piston 13 which are in communication with each other and form a pressure fluid-receiving space. Also, a connection 31 for a pressure pump is provided in the actuating housing 5 which pump, however, is not illustrated for the sake of simplicity. This connection 31 passes over into an annular groove 32 starting from the interior wall of the actuating housing 5, whereby the annular groove 32 is in communication with the pressure fluid-receiving space 25–29 in the illustrated position of the actuating servo-piston 13. The actuating servo-piston 13 can be displaced in the direction toward the master cylinder 6 so that the connection of the annular groove 32 with the pressure fluid-receiving space 25–29 can be interrupted and thereupon the connection with the working pressure space 24 is established. As a result thereof, the actuating servo-piston 13 is acted upon by the hydraulic fluid set under pressure by the pump and is displaced in the direction toward the master cylinder 6.

The free end 33 of the actuating servo-piston 13 facing the master cylinder 6 projects into a connecting spacer 34 which is filled with a hydraulic fluid. The free end 33 of the actuating servo-piston 13 has a smaller cross section than the cross section of the master cylinder piston 14. As a result thereof, the force exerted by the actuating servo-piston 13 is applied once more translated or increased onto the master cylinder piston 14.

Figure 1A:
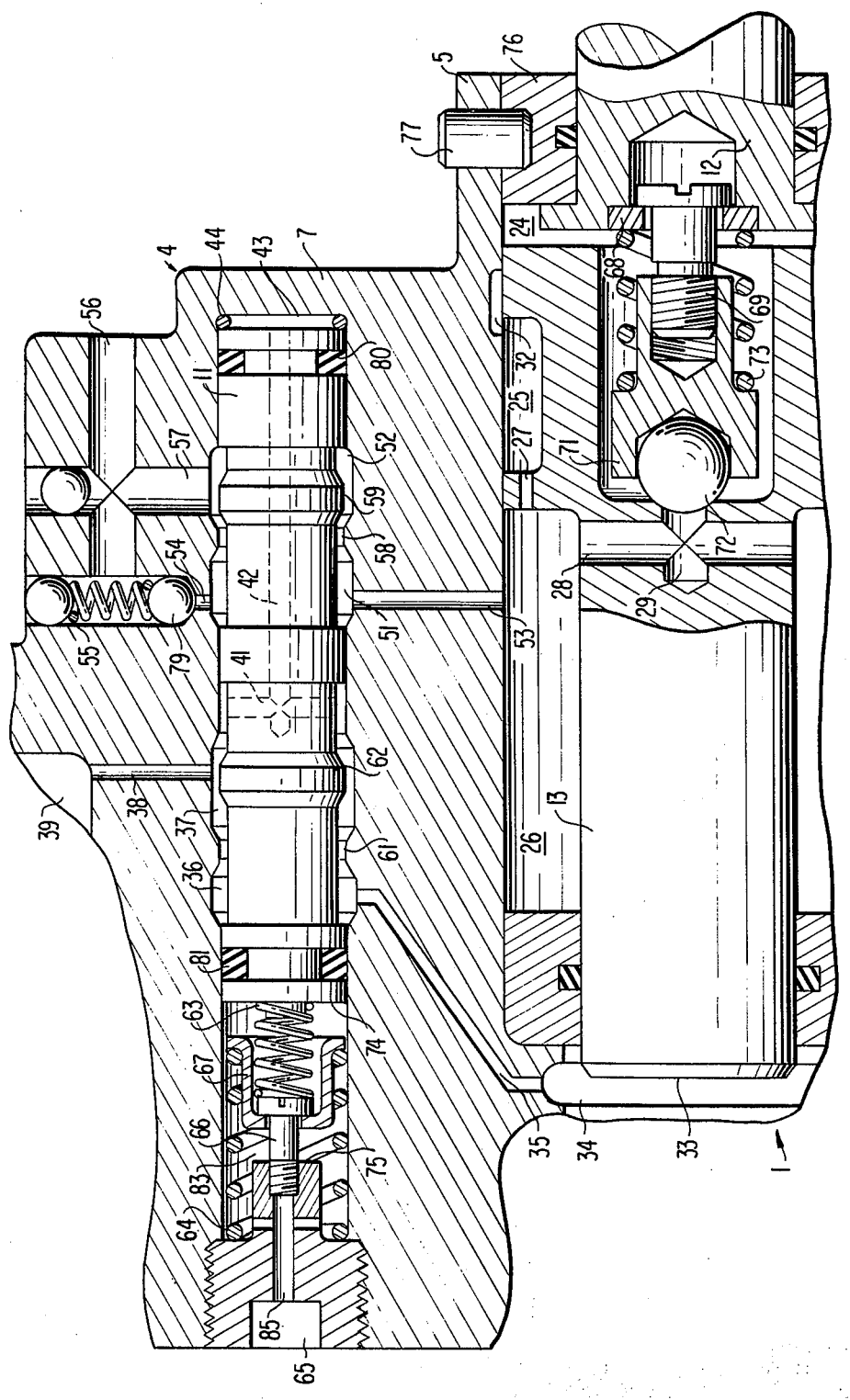
FIG. 1a is a partial cross-sectional view, on an enlarged scale, illustrating the center part of the housing of the installation of FIG. 1.

The connecting space 34 is in communication by way of a bore 35, spaces 36 and 37 (FIGS. 1 and 1a) as well as a bore 38 with a filling cylinder space 39 enclosed between the filling cylinder 8 and the filling piston 9. Furthermore, the space 37 is in communication by way of bores 41 and 42 with a pressure space 43 enclosed between the control cylinder 7 and the control piston 11; the smallest volume of the pressure space 43 is determined by the ring 44 (FIG. 1a).

The filling cylinder space 39 is customarily held under a pressure of about one atmosphere by a compensation spring 45 (FIG. 1) until the idling path or free play of a bolt head 46 of a screw 47 screwed into the filling piston 9 is terminated by abutment at a hat-shaped bracket 48. Until then, the bracket 48 abuts at a plate 49 pressed into the cylinder space.

Spaces 51 and 52 (FIG. 1a) are additionally formed by the control cylinder 7 and the control piston 11. The space 51 is in communication with the pressure fluid-receiving space 25-29 by way of a bore 53 and is in communication by way of a bore 54 with a safety valve 55 which is connected with the return tank by way of a bore 56. Also, the space 52 is connected with this return tank by way of a bore 57 which connects this space 52 with the bore 56.

The spaces 51 and 52, which are connected with each other in the position of the control piston 11 illustrated in the drawing, may also be separated from one another in a position in which the sealing surfaces 58 and 59 coincide with one another, i.e., are aligned or register with one another. The spaces 36 and 37 can be separated from one another in a similar manner when the sealing surfaces 61 and 62 are brought into coincidence, i.e., are aligned or register with one another.

The control piston 11 is brought into the position illustrated in the drawing by a blocking spring 63 (FIG. 1a) and by a control spring 64 cooperating with the blocking spring 63. The control spring 64 is restrained by an abutment 65 screwed into the control cylinder 7, by a screw 66 screwed into this abutment and by a hat-shaped sleeve 67 in order that during the movement of the control piston 11 out of the position illustrated in the drawing in the direction toward the abutment 65, at first the weaker blocking spring 63 is compressed in order to block the return. Only then the control spring 64 is compressed with the consequence which will be described more fully hereinafter. The prestress of the spring 64 determines the prefilling pressure.

A screw 69 is connected with the actuating piston 12 by a ring 68 (FIG. 1a) pressed into the same, which screw 69 retains an insert 71 having a ball 72 which is being pressed by a relief spring 73 against its seat in the orifice of the bore 29.

The installation is so constructed that it works at first with a translation ratio of 1 : 1 from the force introduction at the foot brake pedal up to the master cylinder piston 14. The brake pedal lever 19 thereby pivots essentially about the joint 23. The idle-path or free play of the brake system is bridged with this translation or transmission ratio 1 : 1. This idle-path or free-play can be traversed with a very small foot force by reason of the slight force of the blocking spring 63.

In the rest position illustrated in the drawing, the filling cylinder space 39 is in communication with the connecting space 34 by way of the bore 38, the spaces 37 and 36 as well as the bore 35. Additionally, the space 37 is in communication with the pressure space 43 by way of the bores 41 and 42. The connection of the filling cylinder space 39 with the pressure space 43 remains always preserved. The pump (not shown) is connected with the annular grove 32 provided in the housing 5 (FIG. 1). The hydraulic fluid supplied thereby flows through the annular groove 25, the bores 27, the step 26, the bore 53, the spaces 51 and 52 and the bores 57 and 56 which are connected with a return tank (not shown).

If the brake pedal is actuated from this rest position, then at first the so-called filling period commences, i.e., the pressure in the spaces 39, 37, 43, 36 and 34 increases. The smallest resistance thereby occurs at the control piston 11 which is displaced in the direction toward the abutment 65 by the pressure built up in the pressure space 43 against the pressure of the blocking spring 63. The blocking spring 63 is compressed until the end face 74 (FIG. 1a) of the control piston 11 abuts at the sleeve 67. At that time, the sealing surfaces 58 and 59 are also aligned with each other, i.e., register with one another, and thereby close off the space 51 with respect to the return tank (not shown) to which leads the line 56. The pressure fluid-receiving space 25-29 with the bore 53 and the space 51 now act as a rigid fluid column. The actuating pistons, namely the actuating piston 12 and the actuating servo-piston 13, now are no longer able to move toward the master cylinder 6. The joint 23 has now become a fixed pivot point for the brake pedal lever 19. The translation of the brake pedal lever now amounts to 1 : 1. The filling piston 9 continues to move in the direction toward the brake pedal 17 and the pressure in the filling cylinder space 39 and therewith in the spaces 34, 36, 37 and 43 continues to be increased until the idle-path or free-play of the system is bridged or overcome. More particularly, at this moment, the pressure in the aforementioned spaces exceeds a predetermined amount which is dependent on the prestress of the control spring 64. The control piston 11 is able to continue to move in this direction so far until the sleeve 67 (FIG. 1a) abuts at the head surface 75 of the abutment 65. At this instant, the sealing surface 62 has also slid over the sealing surface 61 so that the connecting space 34 together with the space 36 are now separate from the filling cylinder space 39. The spaces 39 and 43 now act as a rigid fluid column and the filling piston 9 now also is no longer able to move under the pressure of the brake pedal lever 19 toward the latter. As a result thereof, the joint at 21 is fixed and the brake pedal lever 19 must now pivot about this joint. In the meantime, the sealing surface 59 has traversed or passed over the sealing surface 58 due to the movement of the control piston 11 in the direction toward the abutment 65 so that the fluid-receiving space 25-29 now again is in communication by way of the spaces 51 and 52 with the bore 56 and therewith with the return tank and as a result thereof the actuating servo-piston 13 is no longer restrained. The actuating servopiston 13 is displaced in the direction toward the master cylinder 6 under the influence of the foot force acting on the actuating piston 12. The annular groove 32 (FIG. 1) is thereby separated from the pressure fluid-receiving space, i.e., from the annular groove 25, and is connected with the working pressure space 24. The pump (not shown) now feeds into this working pressure space 24 so that the pressure in this space continues to increase and the actuating servopiston 13 continues to be displaced toward the master cylinder pistons 14 and 15. The translation of the brake servo-unit is now 1 : 6 during the pivoting of the brake pedal level 19 about the pivot point 21. The pressure prevailing in the working space 24 provides by way of the actuating piston 12 a feedback to the driver by way of the brake pedal 19 and indicates to the driver the pressure exerted on the brake linings.

In order that with a large force exertion by way of the pedal 17, the pressure on the ball 72 (FIG. 1a) does not increase to an undesirably large extent and as a result thereof, its surface or its seat is damaged, a relief spring 73 is provided which brings about that the ball 72 is always pressed only with the pressure force of the relief spring 73 against its seat, regardless of the magnitude of the force application on the actuating servo-piston 13.

The mechanical translation of the brake pedal 17 now amounts to about 1 : 4 in a similar manner as in the presently customary systems with vacuum booster. Added thereto is the hydraulic translation with the cross-sectional ratio of the free end 33 of the actuating servo-piston 13 to the master cylinder piston 14 which brings about an overall translation or transmission ratio of 1 : 6.

If the brake is released, then all described operations take place in the reverse sequence. If one reduces the root force, then the pistons 12 and 13 move away from one another, the ring 68 moves the screw 69 in a direction away from the master cylinder 6 and therewith also the insert 71, into which the ball 72 is pressed in. The ball valve is opened thereby, and as a result thereof, the working pressure space 24 is brought into communication with the fluid pressure-receiving space 25-29 and by way of the bores 53, 57 and 56 with the return tank. The pressure in the working pressure space 24 thereby collapses.

With the release of the brake pedal 17, the working piston 12 moves back so far until it abuts at the insert 76 which is pressed into the working housing 5 and is secured by means of a pin 77.

With a relief of the brake force servo-installation, it is important that the master cylinder pistons 14 and 15 are able to move back rapidly in order that the master cylinder can be vented which is brought about for the most part by a repeated actuation of the brake and sudden release thereof. It is important in connection therewith that the connecting space 34 and therewith no longer the spaces 36, 37 and 39 are under the pressure of the compensating spring 45, which was the case during the initiation of the braking operation, in order that the force exerted by the return springs 78 in the master cylinder 6 on the connecting space 34 can be compensated for. The compensating spring 45 is thereby restrained by the parts 46–49 so that it can become effective on the brake pedal lever 19 only in the beginning of the movement of the filling piston 9.

If the fluid-receiving space 25–29 is closed off from the bore 56 as a result of jamming of the control piston 11, and if the actuating servo-piston 13 is held fast as a result thereof, then the driver can no longer achieve any braking action. If thereupon the pressure in the fluid-receiving space 25–29 becomes excessive, then the safety valve 54, 55 with the ball 79 assures that the bore 54 is brought into communication with the bore 56 and therewith a path is released to the return tank. As a result thereof, the pistons 12 and 13 can again move freely and the function of the filling- and servo-unit remains preserved. The driver notices the defect only by the necessary increase of the foot force.

Quite considerable advantages result from the construction of a brake force servo-installation according to the present invention. In the hitherto customary servo-installations with hydraulic translation jump, a large pedal path is given away or wasted in case of failure of the servo-mechanism. If, for example, a servo-installation with an intact servo-system operates with a pedal translation of about 1 : 4 and in case of failure of the servo-amplification with a translation of 1 : 6, then the ratio of the entire lever translation is:

$$\frac{\text{translation ratio without servo-amplification}}{\text{translation with servo amplification}} = \frac{\frac{1}{6}}{\frac{1}{4}} = \frac{2}{3}$$

The pedal path or travel is therefore reduced to $\frac{2}{3}$ of its original length. Since some brake installations require already about $\frac{1}{3}$ of the pedal path or travel as idle path or free play, it becomes critical with the servo amplification since only $\frac{2}{3} \cdot \frac{2}{3} = 4/9$ of the pedal path now remains available for the braking action. In contrast thereto, the situation in the brake force servo-installation according to the present invention is completely different. This is so as one is able to continue to brake directly without travel loss in case of failure of the servo amplification by traversing the idle path or free play with a translation of 1 : 1 in lieu of 1 : 4, because after the filling one will always operate with a translation ratio of 1 : 6. No shifting thereby occurs in case of failure of the energy source but instead braking will continue with the same translation ratio. Even with an unfavorable design, in lieu of $\frac{1}{3}$ one still has only $\frac{1}{3}$ · $\frac{1}{4} = 1/12$ of the brake path as loss. Additionally, in the installation according to the present invention no jumps occur during the shifting from the translation 1 : 1 to the translation 1 : 6, either in the braking or in the foot force which represents a main feature of the present invention of the brake force servo-unit described herein.

Furthermore, in case of failure of a brake circuit, the filling piston is able to replace the pedal path loss up to 75%. The psychological situation of the driver is thereby considerably improved because only a considerably smaller falling-through of the pedal occurs. Troubles occur for the most part at the pump, i.e., at the energy source. In the contrast thereto, only the packing rings 80 or 81 (FIG. 1a) can be damaged in the filling or control unit of the present invention. However, they will probably last much longer than the packing rings of the master cylinder since they are loaded much less. If therefore the filling unit falls which essentially consists of filling cylinder 8 and filling piston 9, then the actuating servo-piston 13 traverses a small idling path until it contacts the master cylinder piston 14. Then the system can be continued to be actuated with the now existing translation of 1 : 4.

The brake force servo-unit according to the present invention additionally makes it possible to realize a meaningful filling translation of 1 : 1 by the displaceable pivot point of the brake pedal 17 and of the brake pedal lever 19. This becomes noticeable in a positive manner both when bridging the idle path or free play as also in case of failure of a brake circuit. Approximately 75% of the customarily resulting pedal idle path or free play can be gained for the braking action. As a result thereof, the safety of a vehicle is considerably increased in case of a brake circuit failure.

As to the rest, the gained pedal path or travel enables to operate with a higher pedal translation than customary because under load no shifting takes place from a smaller translation.

The known disadvantages of a jump from smaller to larger translation in case of failure of the pump are completely obviated. The foot force is the refore utilized considerably more favorably than in the hitherto customary constructions. In case of failure of the servo-mechanism, the driver is thereof in a more advantageous position from a force- and pedal-point of view as compared to brake systems with translation jump.

Furthermore, it is possible to operate with smaller servo-pressures due to the higher translation. The pump can therefore be operated with brake fluid. Consequently, the hydraulic oil attacking above all the brake saddle or brake caliper packing rings can be dispensed with. The entire brake and servo-installation therefore operates with only a single fluid.

Furthermore, the brake force servo-installation according to the present invention operates with a customary master cylinder, and one is able to brake with the non-boosted or non-amplified system in case of failure of the entire servo-and filling-installation. Also the failure of several structural parts has no disadvantages as compared to the hitherto customary series-produced brake force servo-installations.

Finally, the actuating-, servo- and adjusting devices in a brake force servo-installation according to the present invention can be combined with a unit which, simultaneously accommodates the control devices for the filling and the servo-amplification. As a result thereof, a compact brake force servo-mechanism requiring little space can be assembled.

In order that no vacuum results by the movement of the filling piston 9 in the space 82 (FIG. 1) and by the movement of the control piston 11 in the space 83 (FIGS. 1 and 1a), apertures 84 and 85 are provided respectively in the plate 49 and in the abutment 65. These apertures may be brought into connection with a hydraulic liquid reservoir tank.

Figure 2:
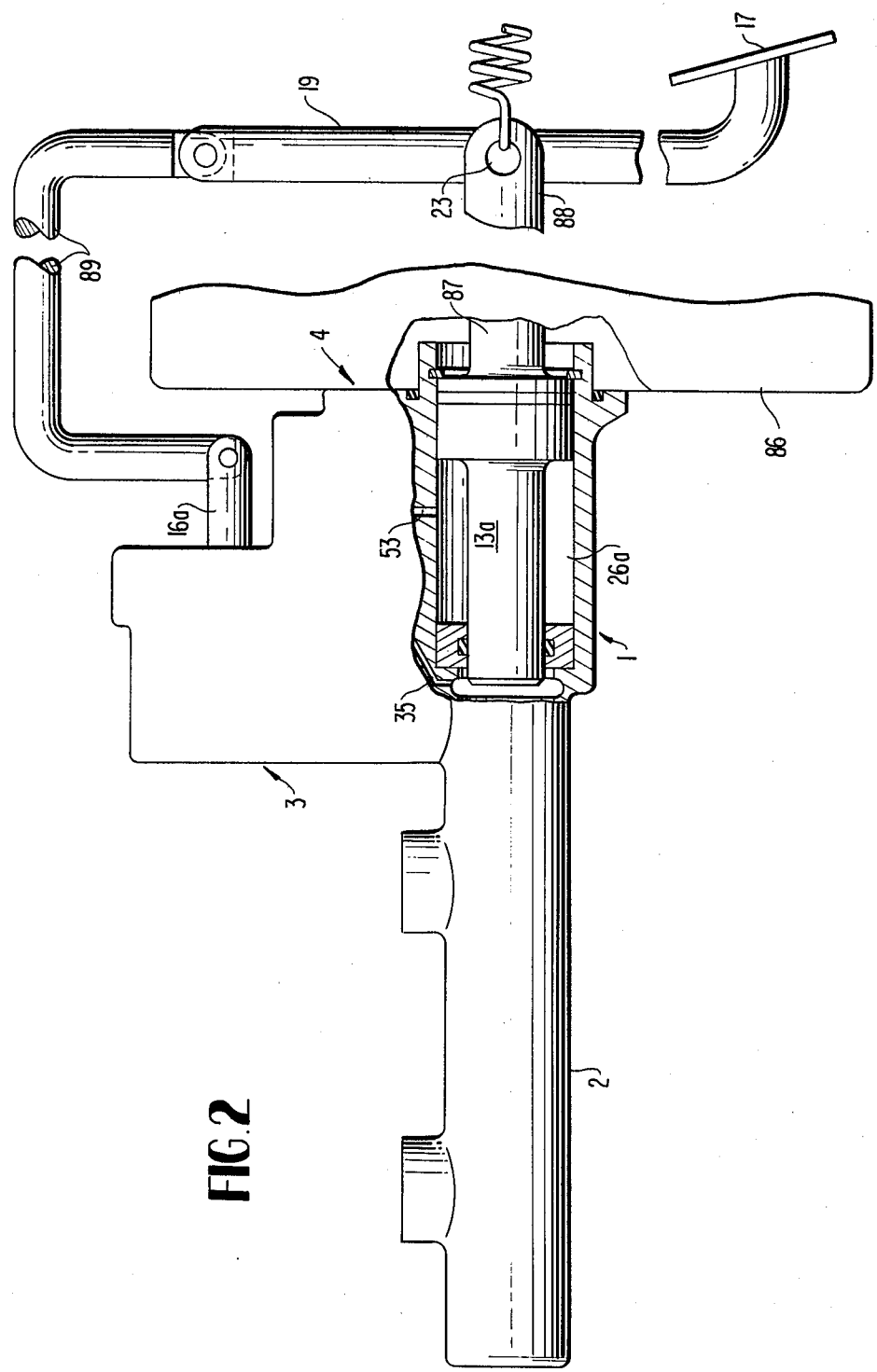
FIG. 2 is a somewhat schematic, partial side elevational view, partly in cross section, through a corresponding brake force servo-installation in accordance with the present invention, which can be pneumatically actuated with the aid of a vacuum booster.

In FIG. 2, an embodiment is illustrated which does not include an actuating circulatory system set under pressure by a pump. The brake force boost or amplification is adduced in this embodiment by a vacuum booster 86 of conventional construction. This vacuum booster 86 operates in this case on the actuating piston 87. The vacuum booster 86 is controlled in this case by an actuating rod 88 which, as in the preceding embodiment, is pivotally connected in point 23 at the brake pedal lever 19. The pressure fluid-receiving space 26a is formed in that case exclusively by a step of the actuating mechanism of the servo-piston 13a. Since the vacuum booster 86 has a relatively large diameter, the connection of the filling piston rod 16a with the brake pedal lever 19 is established merely by a by-pass rod 89. As to the rest, the behavior of the actuating servo-installation pneumatically actuated in this case is the same as in the first embodiment.

With a purely mechanical construction of the actuating of the brakeforce servo-unit according to the present invention, a corresponding connecting member to the joint 23 is provided in the place of the actuating rod 88, which is constructed as working piston on the side of the booster of servo-device.

With the use of vacuum boosters, whose booster or servo-force is no longer satisfactory for heavy vehicles, an increase of about 30% of the booster power or amplification can be attained by the construction in accordance with the present invention.

The lever system ratios in the present-day automobiles need not be changed. With the installation of the apparatus in accordance with the present invention, only an adaptation to the master cylinder is necessary (pedal lever translation remains 1 : 4).

One could also utilize the control piston 11 to block off the master cylinder from the return tank during the beginning of the braking action so that the packing rings in the master cylinder need not pass over any expansion ports. This effects a considerable increase in the length of life.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A brake force servo-installation including an actuating means, servo and adjusting means operatively connected with said actuating means, a master cylinder means acted upon by said actuating means, filling means operatively connected with said actuating means, master cylinder means and said servo and adjusting means, control and shifting means operatively connected with said actuating means, said master cylinder means, and said filling means, and a brake pedal lever pivotally connected to the filling means and the actuating means, characterized in that the actuating means includes an actuating piston having a piston rod, the filling means are separated from said actuating means and includes a filling cylinder space means for accommodating a hydraulic fluid, a filling piston means for controlling a volume of the filling cylinder space means, and a piston rod, the brake pedal lever includes a first and second end with a brake pedal mounted at said first end, means are provided for pivotally connecting said second end of said brake pedal lever with said piston rod of said filling piston means, means are provided for pivotally connecting said brake pedal with said piston rod of said actuating piston at a position on said brake pedal lever between said brake pedal and the pivotal connection of the brake pedal lever with said piston rod of said filling piston means, the master cylinder means includes master piston means displaceably arranged in a master piston housing, said servo and adjusting means includes an actuating servo-piston having a smaller cross-section than a cross-section of said master piston means and pressure hydraulic fluid receiving spaces, a connecting space means arranged between said master piston means and said actuating servo-piston for defining a pressure space between said actuating servo-piston and said master piston means, the control and shifting means includes a housing, a displaceably mounted control piston means arranged in a bore provided in the housing, said control piston means and said bore are so configured so as to define a plurality of pressure spaces, first bore means for communicating a first of said plurality of pressure spaces with said connecting space means, second bore means for communicating a second of said plurality of pressure spaces with said filling cylinder space means, third bore means for communicating a third pressure space of said plurality of pressure spaces with the pressure fluid receiving spaces of said servo and adjusting means, said control piston means including an end face which defines with a portion of said housing a fourth pressure space, further bore means provided in said control piston means for communicating said fourth pressure space with said second bore means so as to provide a supply of hydraulic fluid to said fourth pressure space, spring means for normally biasing said control piston means in a direction opposite a direction of displacement of said control piston means by the hydraulic fluid, line means for communicating said third pressure space with a return tank, means provided on said control piston means and said bore in which said control piston means is arranged for closing said third pressure space from said line means upon reaching a first predetermined interior pressure in said fourth pressure space which displaces the control piston means against the force of said spring means such that the pressure hydraulic fluid receiving spaces of said servo and adjusting means, said third bore means and said third pressure space form a rigid fluid column thereby preventing said actuating piston and said actuating servo-piston from acting upon the master piston means whereby the pivotal connection of said brake pedal lever with said piston rod of said actuating piston is effective as a fixed pivot point of the brake pedal lever, and in that, upon a further displacement of said control piston means, said closing means opens said third pressure space and closes said first pressure space from said filling cylinder space means such that said filling cylinder space means and said fourth pressure space form a rigid fluid column preventing said filling piston means from moving thereby resulting in a shift of the point of pivotal connection of the brake pedal lever from the pivotal connection of the brake pedal lever with the piston rod of said actuating piston to the pivotal connection of said brake pedal lever with said piston rod of said filling piston means, and in that, after a shifting of the point of pivotal connection, hydraulic fluid, supplied from a pump means, is effective upon an end face of the actuating servo-piston facing the brake pedal so as to displace the actuating servo-piston in a direction toward the master piston means thereby automatically shifting from a first brake pedal lever ratio to a different brakepedal lever translation ratio.

2. A brake force servo-installation according to claim 1, characterized in that upon a closing of said third pressure space from said line means, a translation ratio of about 1 : 1 is obtained, and in that upon reopening of said third pressure space and the shifting of the point of pivotal connection, a translation ratio of about 1 : 6 is obtained.

3. A brake force servo-installation including an actuating means, servo and adjusting means operatively connected with said actuating means, a master cylinder means acted upon by said actuating means, filling means operatively connected with said actuating means, master cylinder means and said servo and adjusting means, control and shifting means operatively connected with said actuating means, said master cylinder means and said filling means, and a brake pedal lever pivotally connected to the filling means and the actuating means, characterized in that the actuating means includes an actuating piston having a piston rod, the filling means are separated from said actuating means and includes a filling cylinder space means for accommodating a hydraulic fluid, a filling piston means for controlling a volume of the filling cylinder space means, and a piston rod, the brake pedal lever includes a first and second end with a brake pedal mounted at said first end, means are provided for pivotally connecting said second end of said brake pedal lever with said piston rod of said filling piston means, means are provided for pivotally connecting said brake pedal lever with said piston rod of said actuating piston at a position on said brake pedal lever between said brake pedal and the pivotal connection of the brake pedal lever with said piston rod of said filling piston means, the master cylinder means includes master piston means displaceably arranged in a master piston housing, said servo and adjusting means includes an actuating servo-piston having a smaller cross-section than a cross-section of said master piston means and pressure hydraulic fluid receiving spaces, a connecting space means arranged between said master piston means and said actuating servo-piston for defining a pressure space between said actuating servo-piston and said master piston means, the control and shifting means includes a housing, a displaceably mounted control piston means arranged in a bore provided in the housing, said control piston means and said bore are so configured so as to define a plurality of pressure spaces, first bore means for communicating a first of said plurality of pressure spaces with said connecting space means, second bore means for communicating a second of said plurality of pressure spaces with said filling cylinder space means, third bore means for communicating a third pressure space of said plurality of pressure spaces with the pressure fluid receiving spaces of said servo and adjusting means, said control piston means including an end face which defines with a portion of said housing a fourth pressure space, further bore means provided in said control piston means for communicating said fourth pressure space with said second bore means so as to provide a supply of hydraulic fluid to said fourth pressure space, spring means for normally biasing said control piston means in a direction opposite a direction of displacement of said control piston means by the hydraulic fluid, line means for communicating said third pressure space with a return tank, means provided on said control piston means and said bore in which said control piston means is arranged for closing said third pressure space from said line means upon reaching a first predetermined interior pressure in said fourth pressure space which displaces the control piston means against the force of said spring means such that the pressure hydraulic fluid receiving spaces of said servo and adjusting means, said third bore means and said third pressure space form a rigid fluid column thereby preventing said actuating piston and said actuating servo-piston from acting upon the master piston means whereby the pivotal connection of said brake pedal lever with said piston rod of said actuating piston is effective as a fixed pivot point of the brake pedal lever, and in that, upon a further displacement of said control piston means, said closing means opens said third pressure space and closes said first pressure space from said filling cylinder space means such that said filling cylinder space means and said fourth pressure space form a rigid fluid column preventing said filling piston means from moving thereby resulting in a shift of the point of pivotal connection of the brake pedal lever from the pivotal connectin of the brake pedal lever with the piston rod of said actuating piston be the pivotal connection of said brake pedal lever with said piston rod of said filling piston means, and in that, after a shifting of the point of pivotal connection, hydraulic fluid, supplied from a pump means, is effective upon an end face of the actuating servo-piston facing the brake pedal so as to displace the actuating servo-piston in a direction toward the master piston means thereby automatically shifting from a first brake pedal lever ratio to a different brake pedal lever translation ratio, and in that a working pressure space means is provided between said actuating piston and said actuating servo-piston, a unilaterally acting ball valve means is provided for controlling a communication between at least one of said pressure-fluid receiving spaces and the working pressure space means, said ball valve means including a ball valve, a valve seat, and a restrained relief spring means supported against the actuating piston means for pressing the ball valve against the valve seat, and in that restraining action on said relief spring means assures an approximately constant abutment pressure of the ball valve against the valve seat with a pressure of the actuating piston means against the actuating servo-piston or with a pressure increase in the working space means.

4. A brake force servo-installation according to claim 3, characterized in that a further line means is provided for communicating said third pressure space with said first-mentioned line means, a safety valve means is arranged in said further line for operatively connecting said further line means with the first-mentioned line means upon exceeding a predetermined limit pressure in said third pressure space.

5. A brake force servo-installation according to claim 4, characterized in that a common housing means is provided for the servo- and adjusting means, the filling means, and the control and shifting means, said control and shifting means being disposed between said servo- and adjusting means and the filling means, and in that the common housing means is assembled with the master cylinder means so as to form a single structural unit.

6. A brake force servo-installation including an actuating means, servo- and adjusting means operatively connected with said actuating means, a master cylinder means acted upon by said actuating means, filling means operatively connected with said actuating means, master cylinder means and said servo- and adjusting means, control and shifting means operatively connected with said actuating means, said master cylinder means and said filling means, and a brake pedal lever pivotally connected to the filling means and the actuating means, characterized in that the actuating means includes an actuating piston having a piston rod, the filling means are separated from said actuating means and includes a filling cylinder space means for accommodating a hydraulic fluid, a filling piston means for controlling a volume of the filling cylinder space means, and a piston rod, the brake pedal lever includes a first and second end with a brake pedal mounted at said first end, means for connecting said filling means and said actuating means with said control and shifting means so that one of said piston rods is prevented from moving upon an actuation of the brake pedal lever during an idle path with a first brake pedal lever ratio and, upon traversing the idle path, said piston rod is released so as to automatically shift to a different brake pedal lever ratio, and in that the master cylinder means includes master piston means, said servo- and adjusting means includes an actuating servo-piston having a smaller cross-section than a cross-section of said master piston means and pressure hydraulic fluid receiving spaces, a connecting space means arranged between said master piston means and said actuating servo-piston for defining a pressure space between said actuating servo-piston and said master piston means, the control and shifting means includes a housing, a displaceably mounted control piston means arranged in a bore provided in the housing, said control piston means and said bore are so configured so as to define a plurality of pressure spaces, first bore means for communicating a first of said plurality of pressure spaces with said connecting space means, second bore means for communicating a second of said plurality of pressure spaces with said filling cylinder space means, third bore means for communicating a third pressure space of said plurality of pressure spaces with the pressure fluid receiving spaces of said servo- and adjusting means, said control piston means including an end face which defines with a portion of said housing a fourth pressure space, further bore means provided in said control piston means for communicating said fourth pressure space with said second bore means so as to provide a supply of hydraulic fluid to said fourth pressure space, spring means for normally biasing said control piston means in a direction opposite a direction of displacement of said control piston means by the hydraulic fluid, line means for communicating said third pressure space with a return tank, means provided on said control piston means and said bore in which said control piston means is arranged for closing said third pressure space from said line means upon reaching a first predetermined interior pressure in said fourth pressure space which displaces the control piston means against the force of said spring means such that the pressure hydraulic fluid receiving spaces of said servo- and adjusting means, said third bore means and said third pressure space form a rigid fluid column thereby preventing said actuating piston and said actuating servo-piston from acting upon the master piston means whereby the pivotal connection of said brake pedal lever with said piston rod of said actuating piston is effective as a fixed pivot point of the brake pedal lever and in that, upon a further displacement of said control piston means, said closing means opens said third pressure space and closes said first pressure space from said filling cylinder space means such that said filling cylinder space means and said fourth pressure space form a rigid fluid column preventing said filling piston means from moving thereby resulting in a shift of the point of pivotal connection of the brake pedal lever, and in that, after a shifting of the point of pivotal connection, hydraulic fluid, supplied from a pump means, is effective upon an end face of the actuating servo-piston facing the brake pedal so as to displace the actuating servo-piston in a direction toward the master piston means.

7. A brake force servo-installation according to claim 6, characterized in that the filling means and the actuating means are arranged separated from one another.

8. A brake force servo-installation according to claim 7, characterized in that the actuating means is a hydraulic actuating means.

9. A brake force servo-installation according to claim 7, characterized in that the piston rod of the filling piston means is pivotally connected to said brake pedal lever at said second end, and the piston rod of the actuating piston means is pivotally connected to said brake pedal lever at a position on said brake pedal lever between said first and second end.

10. A brake force servo-installation according to claim 7, characterized in that the filling piston means is larger in cross section than the master piston means, actuating piston means and servo-piston.

11. A brake force servo-installation according to claim 6, characterized in that the piston rod of the filling piston means is pivotally connected to said brake pedal lever at said second end, and the piston rod of the actuating piston means is pivotally connected to said brake pedal lever between said first and second end.

12. A brake force servo-installation according to claim 6, characterized in that the filling piston means is larger in cross section than the master piston means, actuating piston and servo-piston.

13. A brake force servo-installation according to claim 6, characterized in that return spring means are provided for exerting a pressure on the master piston means, a restrained compensating spring means is accommodated in a space of the filling means for compensating the pressure exerted by said return spring means in an idling path of the brake pedal lever, the restraining action on said compensating spring means permitting the rapid return of the piston means of the master cylinder means for purposes of venting.

14. A brake force servo-installation according to claim 13, characterized in that aperture means are provided in the space accommodating the compensating spring means for communicating said space with a hydraulic fluid reserve tank so as to avoid a vacuum in said accommodating space.

15. A brake force servo-installation according to claim 6, characterized in that said spring means normally biasing the control piston means includes a first spring and a second spring, said first spring having a smaller blocking force than said second spring, said blocking force is not overcome until the closing of said third pressure space from said line means, and in that upon an increase in hydraulic pressure, the blocking force of the second spring is overcome with said second spring effecting a restraining action so as to enable the response of the first spring prior to the blocking force of the second spring to be effective.

16. A brake force servo-installation according to claim 15, characterized in that a spring-receiving space means is provided in the housing of said control and shifting means for receiving said first and second springs, and in that a small aperture means is provided for venting said spring receiving space means.

17. A brake force servo-installation according to claim 6, characterized in that a line is provided for communicating a pressure space of said control and shifting means with a return tank, and in that a safety valve means is arranged in said line for operatively connecting the pressure space with the return tank upon exceeding a limit pressure in the pressure space.

18. A brake force servo-installation according to claim 6, characterized in that a common housing means is provided for the servo- and adjusting means, the filling means, and the control and shifting means, said control and shifting means being disposed between said servo- and adjusting means and the filling means, and in that the common housing means is assembled with the master cylinder means so as to form a single structural unit.

* * * * *